F. C. RENNER, OF LADIESBURG, MARYLAND.

Letters Patent No. 91,667, dated June 22, 1869.

IMPROVED FERTILIZER.

The Schedule referred to in these Letters Patent and making part of the same.

*To all whom it may concern:*

Be it known that I, F. C. RENNER, of Ladiesburg, in the county of Frederick, and State of Maryland, have invented a new and improved Fertilizer; and I do hereby declare that the following is a full, clear, and exact description of the construction and operation of the same.

The object of this invention is to provide for public use a cheap and easily-manufactured composition, which shall possess superior qualities as a fertilizer for corn, garden-truck, and other vegetables and cereals.

To this end, I employ a composition manufactured in the following manner:

I take ten hundred and fifty pounds of good rich earth, sieve or screen it to get the gravel out, and spread it, slightly damp, on a floor, or other suitable place.

I then mix together one hundred pounds sulphate of ammonia and fifty pounds crude saltpetre, and with a rake thoroughly incorporate it with the earth.

When the ingredients have been well mixed, I add three hundred pounds of good fine bone-dust, or flour of raw bone, and again mix well; I then add one hundred pounds of salt-cake, and mix well; then two hundred pounds of good Peruvian guano, and mix well; then two hundred pounds of good plaster.

I now mix the whole composition thoroughly, when, after having been thrown in a pile for two or three days, it is ready for use.

Of course any other quantities than those above specified may be employed, care being taken to have their relative proportions substantially the same as above given.

Having thus described my invention,

What I claim as new, and desire to secure by Letters Patent, is—

The compound, substantially as and for the purpose above described.

To the above specification of my invention, I have signed my hand this 28th day of April, 1869.

F. C. RENNER.

Witnesses:
CHAS. A. PETTIT,
SOLON C. KEMON.